United States Patent
Katayama

(10) Patent No.: US 10,569,431 B2
(45) Date of Patent: Feb. 25, 2020

(54) INDUSTRIAL ROBOT SYSTEM OPTICALLY INDICATING MOTION AREA OF ROBOT

(71) Applicant: DENSO WAVE INCORPORATED, Chita-gun, Aichi-pref. (JP)

(72) Inventor: Syu Katayama, Suzuka (JP)

(73) Assignee: DENSO WAVE INCORPORATED, Aichi-Pref. (JP)

(*) Notice: Subject to any disclaimer, the term of this patent is extended or adjusted under 35 U.S.C. 154(b) by 59 days.

(21) Appl. No.: 15/200,504

(22) Filed: Jul. 1, 2016

(65) Prior Publication Data
US 2017/0001316 A1   Jan. 5, 2017

(30) Foreign Application Priority Data
Jul. 3, 2015   (JP) .................... 2015-134679

(51) Int. Cl.
*B25J 19/06* (2006.01)
*H05B 33/08* (2006.01)
*H05B 37/02* (2006.01)

(52) U.S. Cl.
CPC .......... *B25J 19/06* (2013.01); *H05B 33/0842* (2013.01); *H05B 33/0845* (2013.01); *H05B 37/02* (2013.01)

(58) Field of Classification Search
CPC ...... B25J 19/06; H05B 33/0845; H05B 37/02; H05B 33/0842
See application file for complete search history.

(56) References Cited

U.S. PATENT DOCUMENTS

| 2009/0228165 | A1* | 9/2009 | Ozick | A47L 5/30 |
| | | | | 701/23 |
| 2012/0182155 | A1 | 7/2012 | Sato et al. | |
| 2013/0201480 | A1* | 8/2013 | Meinherz | F16P 3/144 |
| | | | | 356/399 |
| 2014/0277733 | A1* | 9/2014 | Kouno | B25J 9/1697 |
| | | | | 700/259 |
| 2015/0217455 | A1* | 8/2015 | Kikkeri | B25J 9/1676 |
| | | | | 700/259 |

FOREIGN PATENT DOCUMENTS

| JP | 2006-007342 A | 1/2006 |
| JP | 2014-188645 A | 10/2014 |
| WO | 2007/085330 A1 | 8/2007 |

* cited by examiner

*Primary Examiner* — Abhishek Sarma
(74) *Attorney, Agent, or Firm* — Oliff PLC

(57) ABSTRACT

There is provided a robot system including robots installed on a floor surface and configured to execute a plurality of tasks. The robot system further includes an irradiating unit capable of irradiating visible light onto the floor surface. The irradiating unit is controlled so as to irradiate the visible light onto a motion area on the floor surface. The motion area is an area occupied on the surface of the floor by a space within which the robot is allowed to move during execution of the tasks.

10 Claims, 12 Drawing Sheets

(a) ROBOT EXECUTION SPEED: 100%   (b) ROBOT EXECUTION SPEED: 50%

(a) MOTION DIRECTION: D1      (b) MOTION DIRECTION: D2

INDUSTRIAL ROBOT SYSTEM OPTICALLY INDICATING MOTION AREA OF ROBOT

CROSS REFERENCE TO RELATED APPLICATIONS

This application is based on and claims the benefit of priority from earlier Japanese Patent Application No. 2015434679 filed Jul. 3, 2015, the description of which is incorporated herein by reference.

BACKGROUND

Technical Field

The present invention relates to a robot system used for a variety of tasks in facilities such as a plant.

Related Art

Conventionally, a robot system is known in which a safety guard fence is not provided in the periphery of a robot, and a person approaching the robot is detected using an area sensor (refer to PTL 1). In the robot system described in PTL 1, when the area sensor detects that a person is approaching the robot, the robot is stopped.

CITATION LIST

Patent Literature

[PTL 1] JP-A-2014-188645

However, when the robot is stopped each time a person approaches the robot, work efficiency of the robot decreases. In addition, the situation, itself, in which a person enters an area that requires the robot to be stopped is undesirable in terms of safety.

SUMMARY

In light of such circumstances, it is desired to provide a robot system that is capable of suppressing, in advance, entry of a person into an motion area of a robot, even in cases in which a safety guard fence is not provided in the periphery of the robot.

Configurations for solving the above-described problem and working effects thereof will be described below.

In a first mode, a robot system is characteristic of having a robot installed on a surface of a floor, the robot executing a plurality of tasks; an irradiating unit irradiating visible light onto the surface of the floor; and a control unit controlling the irradiating unit to irradiate the visible light onto a motion area on the surface of the floor, the motion area being an area occupied on the surface of the floor by a space within which the robot is allowed to move during execution of the tasks.

In this configuration, the robot, which is installed on the floor surface, is able to execute a plurality of tasks. It is preferred that the robot is composed of a plurality of robots. The radiating unit is able to irradiate visible light onto the floor surface. A motion space necessary for the robot is set previously, within which the robot executes the tasks by moving its actuators. The visible light is thus irradiated onto a motion area on the floor surface, in which the robot's motion space is occupied (or projected) as the motion area on the floor surface. Persons can visibly recognize the motion area of the robot, which is not allowed to enter the motion area. That is, it is possible to warn the person not to enter the motion space. Accordingly, even if there is not safety guard fence around the robot, it is possible to preventing persons from entering the motion area of the robot.

In addition, of the plurality of tasks executed by the robot (or robots), the motion area corresponding to a task which is now executed by the robot is irradiated by the visible light. Hence, when tasks are switched among the plurality of tasks, persons can visibly recognize where is the current motion area in which the robot is now operating. Moreover, the motion area is switched from one place to the next place, it is more effective in attracting attention of a person, compared to a case in which the motion area is positionally fixed on the floor. If a person is about to enter the motion area, a part of the body of the person, which part is already within the motion area, is lighted up by the irradiated visible light. Hence, it is possible to make the person, who is about to enter the motion area, clearly become aware of that fact.

In a second mode, in the above configuration, the control unit is configured to control the irradiating unit so as to irradiate the visible light onto a total motion area on the surface of the floor, the total motion area being defined as totaling a plurality of the motion areas assigned respectively to the plurality of tasks.

According to this configuration, the visible light is irradiated onto the total motion area on the floor surface. Hence, when tasks are switched over among the plurality of tasks, it is possible to prevent a person from entering a switched-over motion area or reduce a possibility of such entering the or reduce a possibility of such enter.

In a third mode, the system comprises a forcible stopping unit forcibly stopping the robot from moving when an abnormality occurs in the robot system, wherein the control unit is configured to control the irradiating unit so as to irradiate the visible light onto a latent area on the surface of the floor, the latent area being an area occupied on the surface of the floor by a space within which the robot is likely to move until the robot is forcibly stopped by the forcible stopping unit during execution of the tasks.

Accordingly, if there occurs an abnormality in the robot system, the forcible stopping unit becomes effective, so that the robot can forcibly be stopped from moving the arms and other members. However, there is a concern that the robot may extend its arms and/or other members into a space which is outside the motion space, until the robot is forcibly stopped by the forcible stopping unit during execution of a predetermined task.

In consideration of this concern, the control unit predicts a latent space, which is defined as a space in which the robot moves until the robot is forcibly stopped from being actuated during execution of the predetermined task. By the control unit, the latent area produced by projecting the latent space on the floor can also be predicted, and subjected to irradiation of the visible light. This enables persons to visibly recognize the latent area of the robot, resulting in that a notice of prohibiting entering the latent area can be given to the persons. In addition, tasks executed by the robot are changed from one to another, and, according to such changes, the latent area being displayed optically is also changed positionally from one location to another. Compared to a case in which the latent area is positionally fixed, it is more effective in attracting attention of a person for securing safety.

In a fourth mode, the irradiating unit includes a first irradiating unit that irradiates a first light of visible light onto the surface of the floor and a second irradiating unit that irradiates a second light of visible light differing from the first light onto the surface of the floor; and the control unit is configured to irradiate the first light onto the motion area by the first irradiating unit and irradiates the second light onto the latent area by the second irradiating unit.

Hence, through control from the control unit, the first visible light can be irradiated onto the motion area by the first irradiating unit, while the second visible light can be irradiated onto the latent area by the second irradiating unit. It is therefore possible to make a person visibly recognize distinctly between the motion and latent areas of the robot.

In a fifth mode, the latent area is composed of a total latent area obtained by totaling a plurality of the latent areas assigned respectively to the plurality of tasks, the total latent area including an area excluded from the motion area required for the tasks, and the control unit is configured to control the irradiating unit to irradiate the second light onto the area excluded from the motion area.

In this way, of the total latent area, the second light is irradiated onto an area excluded from the motion area in which the robot is now operating. Hence, when tasks are changed from one to another, it is possible to prevent a person from entering the latent area. A proportion between the irradiated total latent area and the motion area is changed, so that, compared to the fixed proportion, it is more effective in attracting attention of a person, thereby securing safety.

In a sixth mode, the motion area is composed of a total motion area obtained by totaling a plurality of the motion areas corresponding respectively to the plurality of the tasks; the latent area is composed of a total latent area obtained by totaling a plurality of the latent areas corresponding respectively to the plurality of tasks, the total latent area including a latent area excluded from the total motion area required for the tasks; and the control unit is configured to control i) the first irradiating unit to irradiate the first light onto the total motion area and ii) the second irradiating unit to irradiate the second light onto the latent area excluded from the total motion area.

Accordingly, the total motion area can be irradiated by the first light, while, of the total latent area, the latent area excluded from the total motion area is radiated by the second light. It is therefore possible to distinguishably display the total motion area and the total latent area from each other on the floor, thereby increasing visibility to persons for securing safety.

DETAILED DESCRIPTION OF PREFERRED EMBODIMENTS (First Embodiment)

A first embodiment that is actualized in a robot system including a vertical, articulated-type robot will hereinafter be described, with reference to the drawings. The robot according to the present embodiment is, for example, used in an assembly line, such as that in a machinery assembly plant, as an industrial robot.

Figure 1:
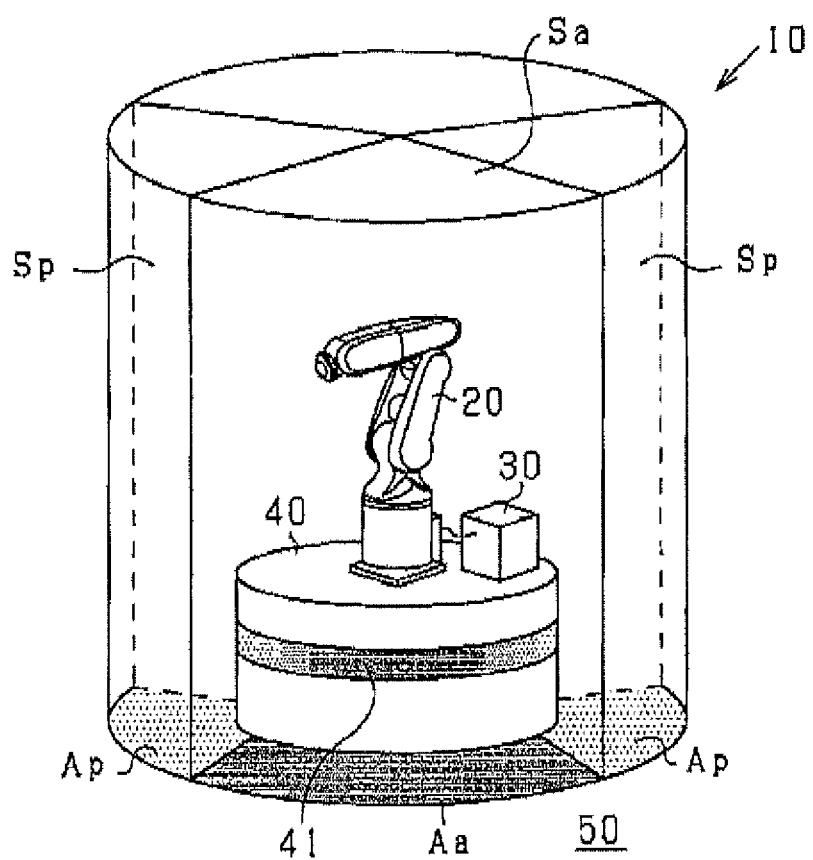
FIG. 1 is a perspective view of an overview of a robot system.

First, an overview of a robot system 10 will be described with reference to FIG. 1. As shown in FIG. 1, the robot system 10 includes a robot 20, a controller 30, a setup base 40, and other necessary devices which are not shown.

The setup base 40 is formed into a circular, columnar shape and is fixed to a floor 50 inside the plant. A center axial line of the setup base 40 is perpendicular to the floor 50. The setup base 40 is a base on which the robot 20 and the controller 30 are set. The robot 20 and the controller 30 are set on top of the setup base 40. In other words, the robot 20 and the controller 30 are set on the floor 50 (that is, the floor surface) with the setup base 40 therebetween.

The robot 20 is a vertical, articulated-type robot that is provided with an articulated arm. The robot 20 includes a motor, a brake, an angle sensor, and the like. The motor drives a joint. The brake applies a brake on a joint. The angle sensor detects a rotation angle of a joint. The motion of the robot 20 is controlled by the controller 30.

The controller 30 (that is, a control unit) includes a central processing unit (CPU), a read-only memory (ROM) functioning as a non-transitory computer readable medium, a random access memory (RAM), a drive circuit, a position detection circuit, although not shown in the drawings. The ROM stores therein a system program, an operation program, and the like of the robot 20. The RAM stores therein parameter values and the like when a program stored in the ROM is run. A detection signal from each angle sensor is inputted to the position detection circuit. The position detection circuit detects the rotation angle of each joint (more specifically, each motor) based on the detection signal from each angle sensor.

The robot 20 performs various tasks by the arm being operated. For example, as shown in FIG. 1, a motion space that is the space in which the robot 20 operates during a predetermined task is an motion space Sa. The motion space Sa is determined in advance based on the length of the arm of the robot 20 and an motion trajectory of the arm during the predetermined task. A motion area Aa is an area on the floor 50 that is occupied by the motion space Sa. The motion area Aa is an area formed by projecting the motion space Sa onto the floor 50. The motion area Aa is set to be in the shape of a fan that radiates from the robot 20.

The controller 30 (that is, a forcible stopping unit) forcibly stops the robot 20 when an abnormality occurs in the robot system 10. For example, when a motion abnormality in the robot 20 or a communication abnormality in the controller 30 is detected, the controller 30 applies a brake to the arm of the robot 20 and immediately stops the robot 20. However, the robot 20 may move into the space outside of the motion space Sa, until the robot 20 is forcibly stopped during a predetermined task.

Here, a latent (or potential) space that is a space in which the robot 20 is likely to operate until the robot 20 is forcibly stopped during a predetermined task can be predicted by the controller 30 as a latent (or potential) space Sp. The latent space Sp is space outside of the motion space Sa. A latent area Ap is an area on the floor 50 that is occupied by the latent space Sp. That is, the latent area Ap is an area formed by projecting the latent space Sp onto the floor 50. The latent area Ap is set to be in the shape of a fan that radiates from the robot 20. According to the present embodiment, the above-described motion area Aa and latent area Ap of the robot 20 are visibly displayed on the floor 50.

Specifically, the above-described setup base 40 is provided with an irradiating unit 41. The irradiating unit 41 irradiates visible light (which is visible to human eyes) onto the floor 50. The irradiating unit 41 includes a first irradiating unit and a second irradiating unit. The first irradiating unit irradiates red light (that is, a first light of the visible light) onto the floor 50. The second irradiating unit irradiates yellow light (that is, a second light of the visible light differing from the first light) onto the floor 50.

The first irradiating unit includes a plurality of red light-emitting diodes (LEDs) that are arrayed at a predetermined interval (such as every 10 degrees in terms of central angle) in a circumferential direction of the setup base 40. The area over which the red light is irradiated onto the floor 50 differs among the plurality of red LEDs. The plurality of red LEDs are arranged over the overall circumference of the setup base 40. The red LEDs to be lit are selected from the plurality of red LEDs, thereby enabling the red light to be irradiated onto an arbitrary motion area Aa. Instead of the red LEDs of the first irradiating unit, the second irradiating unit includes yellow LEDs that are arranged in a similar manner. The yellow LEDs to be lit are selected from the plurality of yellow LEDs, thereby enabling the yellow light to be irradiated onto an arbitrary latent area Ap.

The controller 30 lights the red LEDs, among the plurality of red LEDs, that irradiate the red light onto the motion area Aa. That is, the controller 30 controls the first irradiating unit so that the red light is irradiated onto the motion area Aa. In addition, the controller 30 lights the yellow LEDs, among the plurality of yellow LEDs, that irradiate the yellow light onto the latent area Ap. That is, the controller 30 controls the second irradiating unit so that the yellow light is irradiated onto the latent area Ap. A display means for visibly displaying the motion area Aa and the latent area Ap on the floor 50 is configured by the irradiating unit 41 and the controller 30.

Figure 2:
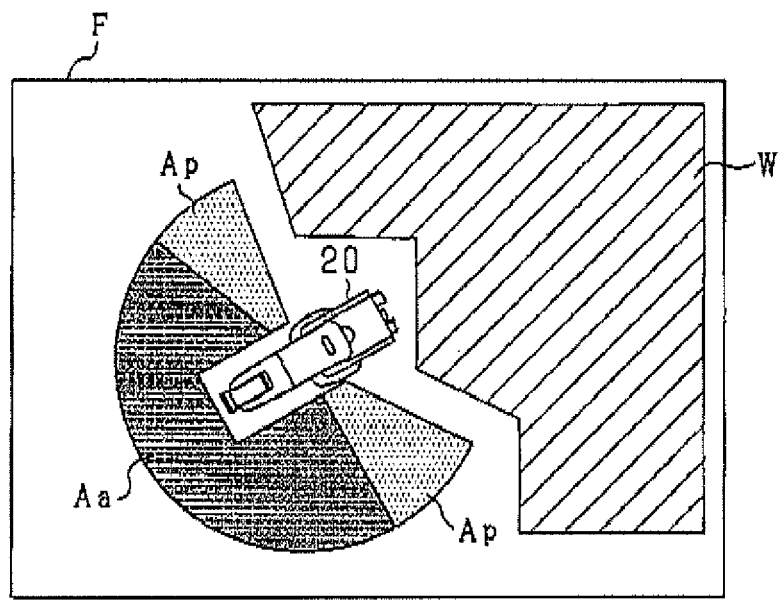
FIG. 2 is a planar view of a work area of a worker, and an motion area and a latent area of a robot.

FIG. 2 is a planar view of a work area W of a worker, and the motion area Aa and the latent area Ap of the robot 20.

The robot 20 is set in a facility area F inside the plant. A safety guard fence is not provided in the periphery of the robot 20. As described above, the red light is irradiated onto the motion area Aa and the yellow light is irradiated onto the latent area Ap. Therefore, a worker (that is, a person) is able to visually confirm the motion area Aa and the latent area Ap of the robot 20. Consequently, the worker no longer enters the motion area Aa and the latent area Ap, and works in the work area W of the facility area F.

Here, the latent space Sp of the robot 20 when an abnormality occurs in the robot system 10 becomes larger as the execution speed at which the robot 20 executes a predetermined task increases. The execution speed is a value that indicates the corresponding percentage of speed, with the execution speed when the robot 20 executes a predetermined task in the shortest amount of time being assigned to 100%. A motion speed, which is an instantaneous speed of the robot 20, also changes based on the execution speed. For example, the motion speed increases as the execution speed increases. Therefore, a setting based on the motion speed is also based on the execution speed.

Figure 3:
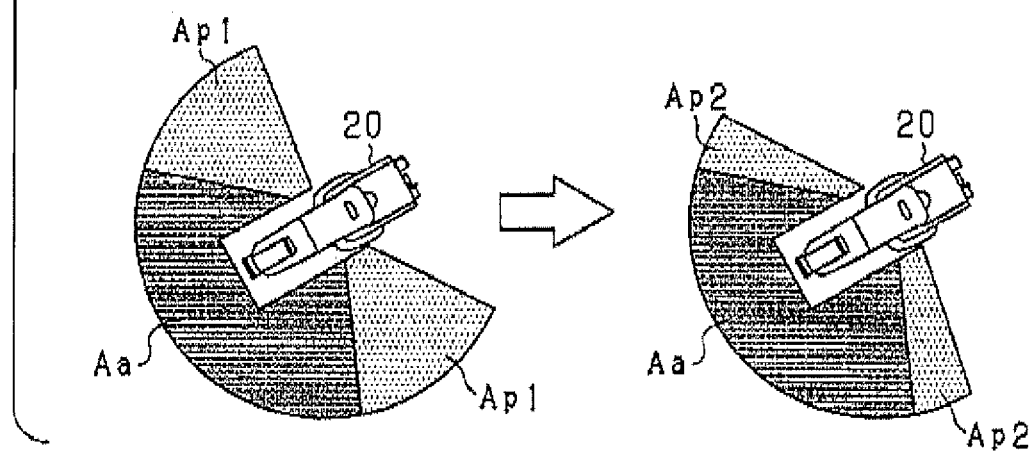
FIG. 3 shows, in its parts (a) and (b), a planar view of the motion area and the latent area of the robot at an execution speed of 100%, and a planar view of the motion area and the latent area of the robot at an execution speed of 50%.

FIG. 3, i.e., (a) thereof, is a planar view of the motion area Aa and the latent area Ap at an execution speed of 100%. FIG. 3, i.e., (b) thereof, is a planar view of the motion area Aa and the latent area Ap at an execution speed of 50%.

As shown in the parts (a) and (b) of FIG. 3, the motion area Aa is the same when the execution speed of the robot 20 is 100% and 50%. A reason for this is that the motion trajectory of the robot 20 during a predetermined task is determined in advance regardless of the execution speed. However, a latent area Ap1 when the execution speed is 100% is set to be larger than a latent area Ap2 when the execution speed is 50%. A reason for this is that, because the motion speed increases as the execution speed increases, the movement distance over which the robot 20 moves, from when the controller 30 attempts to stop the robot 20 until the robot 20 stops, increases. Therefore, according to the present embodiment, the latent area Ap1 when the execution speed at which the robot 20 executes the predetermined task is higher than or equal to a predetermined speed is set to be larger than the latent area Ap2 when the execution speed is lower than the predetermined speed.

Figure 4:
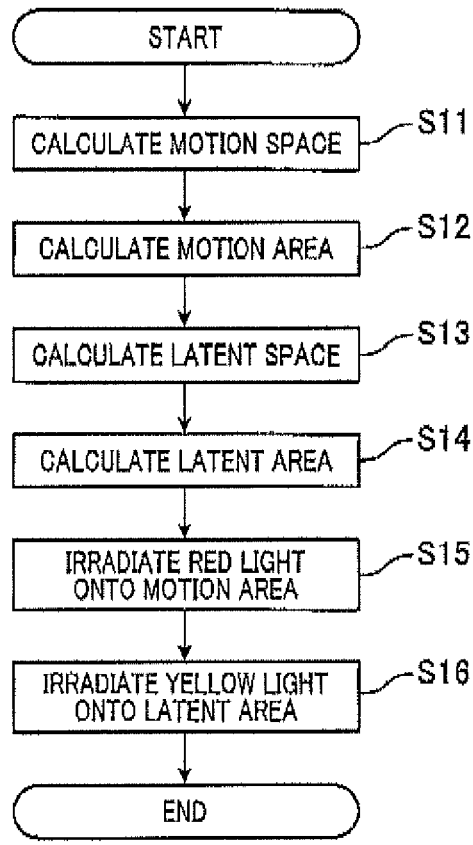
FIG. 4 is a flowchart of the steps in a process in which visible light is irradiated onto the motion area and the latent area.

FIG. 4 is a flowchart of the steps in a process in which the visible light is irradiated onto the motion area Aa and the latent area Ap. This series of processes is performed by the controller 30 before the robot 20 starts a predetermined task.

First, the controller 30 calculates the motion space Sa of the robot 20 for the predetermined task (S11). Specifically, the controller 30 calculates the motion space Sa based on the motion trajectory of the arm of the robot 20 for the predetermined task, the length of the arm, and the coordinates of the robot 20.

Next, the controller 30 calculates the motion area Aa of the robot 20 for the predetermined task (S12). Specifically, the controller 30 calculates the motion area Aa by projecting the motion space Sa onto the floor 50 based on the coordinates of the robot 20.

Next, the controller 30 calculates the latent space Sp of the robot 20 for the predetermined task (S13). Specifically, the controller 30 calculates the latent space Sp based on the execution speed at which the robot 20 executes the predetermined task and deceleration characteristics of the robot 20. The latent space Sp is set to be larger as the execution speed increases. In addition, regarding the deceleration characteristics, deceleration of the robot 20 becomes more difficult as the length of the arm increases, the weight of the arm increases, the inertia of the motor increases, and the weight of the workpiece to be conveyed increases. The latent space Sp is set to be larger as the deceleration characteristics indicate greater difficulty in deceleration.

Next, the controller 30 calculates the latent area Ap of the robot 20 for the predetermined task (S14). Specifically, the controller 30 calculates the latent area Ap by projecting the latent space Sp onto the floor 50 based on the coordinates of the robot 20.

Next, the controller 30 irradiates the red light onto the motion area Aa (S15). Specifically, the controller 30 selects the red LEDs, among the plurality of red LEDs of the irradiating unit 41, that irradiate the red light onto the motion area Aa and lights the selected red LEDs. In other words, the controller 30 does not light the red LEDs, among the plurality of red LEDs of the irradiating unit 41, other than the selected red LEDs.

Next, the controller 30 irradiates the yellow light onto the latent area Ap (S16). Specifically, the controller 30 selects the yellow LEDs, among the plurality of yellow LEDs of the irradiating unit 41, that irradiate the yellow light onto the latent area Ap and lights the selected yellow LEDs. In other words, the controller 30 does not light the yellow LEDs, among the plurality of yellow LEDs of the irradiating unit 41, other than the selected yellow LEDs. Subsequently, the controller ends the series of processes (END).

In the state in which the red light is irradiated onto the motion area Aa and the yellow light is irradiated onto the latent area Ap, the robot 20 executes the predetermined task.

According to the present embodiment described in detail above, the following advantages are achieved.

The motion space Sa that is the space in which the robot 20 operates during a predetermined task is determined in advance. The motion area Aa that is the area on the floor 50 occupied by the motion space Sa of the robot 20 is visibly displayed on the floor 50. Therefore, the worker can visually confirm the motion area Aa of the robot 20. The worker can be prompted to avoid entering the motion area Aa before entering the motion area Aa. As a result, even when a safety guard fence is not provided in the periphery of the robot 20, a situation in which the worker erroneously enters the motion area Aa of the robot 20 can be suppressed in advance.

The latent space Sp that is the space in which the robot 20 is likely to operate until the robot 20 is forcibly stopped during a predetermined task can be predicted in advance by the controller 30. Moreover, the latent area Ap that is the area on the floor 50 occupied by the latent space Sp can be predicted by the controller 30. According to the present embodiment, the latent area Ap of the robot 20 is visibly displayed on the floor 50. As a result, the worker can visually confirm the latent area Ap of the robot 20 and can be prompted to avoid entering the latent area Ap, as well.

The controller 30 controls the irradiating unit 41 so that visible light is irradiated onto the motion area Aa and the latent area Ap of the robot 20. As a result, the motion area Aa and the latent area Ap of the robot 20 can be easily and accurately displayed. In addition, a portion of the body of the worker that has entered the motion area Aa or the latent area Ap is illuminated by the visible light. Therefore, the worker can clearly visually confirm entry into the motion area Aa and the latent area Ap.

The controller 30 irradiates red light onto the motion area Aa of the robot 20 by the first irradiating unit, and irradiates yellow light onto the latent area Ap of the robot 20 by the second irradiating unit. As a result, the worker can differentiate between and visually confirm the motion area Aa and the latent area A of the robot 20.

The latent area Ap when the execution speed at which the robot 20 executes a predetermined task is higher than or equal to a predetermined speed is set to be larger than the latent area Ap when the execution speed is lower than the predetermined speed. Therefore, the size of the latent area Ap can be appropriately set based on the execution speed of the robot 20.

The latent space Sp of the robot 20 when an abnormality occurs in the robot system 10 changes depending on the deceleration characteristics of the robot 20. According to the present embodiment, the latent area Ap is set based on the deceleration characteristics of the robot 20. Therefore, accuracy of the latent area Ap that is set can be improved.

The irradiating unit 41 includes a plurality of LEDs of which the areas over which the visible light is irradiated onto the floor 50 differ. The LEDs irradiating visible light onto the motion area Aa and the LEDs irradiating visible light onto the latent area Ap are selected and lit. As a result, the visible light can be easily irradiated onto the motion area Aa and the latent area Ap.

The first embodiment can also be carried out with the following modifications.

As the execution speed, a value that indicates the percentage of a rated maximum speed of the robot 20 to which a peak value of the motion speed when the robot 20 executes a predetermined task corresponds may be used.

According to the first embodiment, the irradiating unit 41 includes a plurality of LEDs of which the areas over which the visible light is irradiated onto the floor 50 differ. However, the irradiating unit 41 may be configured by a lamp that irradiates visible light at a wide angle and a shielding mechanism that adjusts the area over which the light from the lamp is blocked. The controller 30 may adjust the area over which the light from the lamp is irradiated onto the floor 50 by controlling the shielding mechanism, and enable visible light to be irradiated onto the motion area Aa and the latent area Ap of the robot 20.

Figure 5:
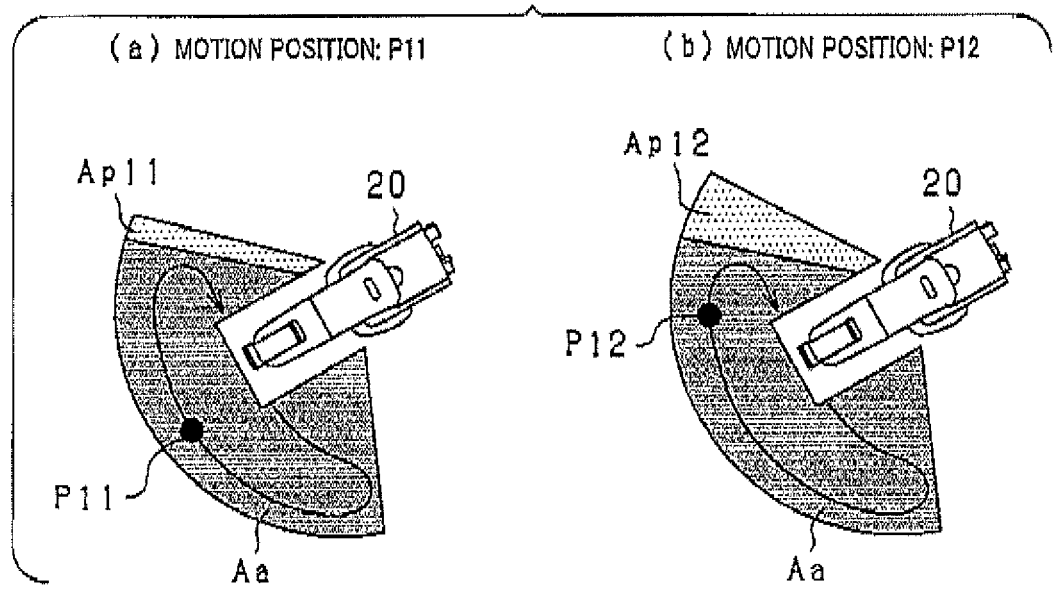
FIG. 5 shows, in its parts (a) and (b), a planar view of the motion area and the latent area when a motion position is near the center, and a planar view of the motion area and the latent area when the motion position near an end portion.

The latent space Sp of the robot 20 provided when an abnormality occurs in the robot system 10 changes depending on the current motion position of the robot 20 in relation to the motion area Aa, during execution of a predetermined task by the robot 20. FIG. 5, i.e., (a) thereof, is a planar view of the motion area Aa and a latent area Ap11 when the current motion position is a motion position P11 near the center. As shown in FIG. 5, i.e., (a) thereof, when the current motion position P11 is near the center, a latent space Sp, and therefore, the latent area Ap11 become small. Meanwhile, FIG. 5, i.e., (b) thereof, is a planar view of the motion area Aa and a latent area Ap12 when the current motion position is a motion position P12 near an end portion. As shown in FIG. 5, i.e., (b) thereof, when the current motion position P12 is near the end portion in the motion area Aa, a latent space Sp, and therefore, the latent area Ap12 become large.

Here, the controller 30 is able to change the latent area Ap based on the current motion position of the robot 20 in relation to the motion area Aa, during the execution of a predetermined task by the robot 20. As a result of a configuration such as this, the latent area Ap can be appropriately changed based on the current motion position of the robot 20 in relation to the motion area Aa. Furthermore, the displayed latent area Ap changes in accompaniment with the changes in the current motion position of the robot 20 during execution of the predetermined task. Therefore, compared to when the size of the latent area Ap is not changed, the attention of a person can be captured.

Figure 6:
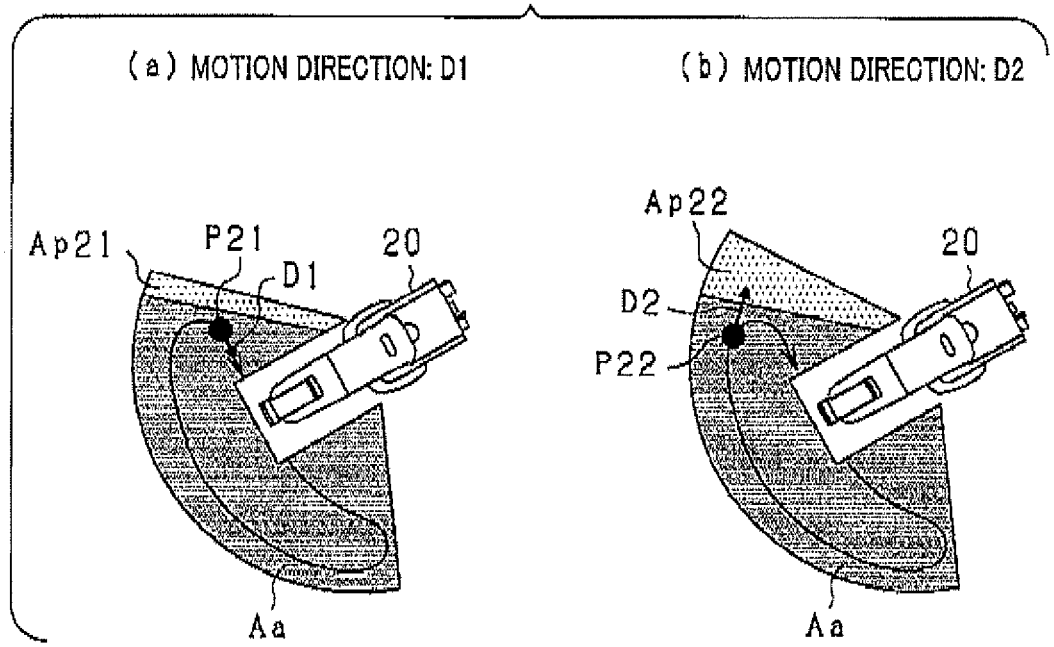
FIG. 6 shows, in its parts (a) and (b), a planar view of the motion area and the latent area when a motion direction is towards the center, and a planar view of the motion area and the latent area when the motion direction is towards the end portion.

The latent space Sp of the robot 20 when an abnormality occurs in the robot system 10 changes depending on a current motion direction of the robot 20 in relation to the motion area Aa during execution of a predetermined task by the robot 20. FIG. 6, i.e., (a) thereof, is a planar view of the motion area Aa and a latent area Ap21 when the current motion direction is a motion direction D1 (motion position P21) towards the center. As shown in FIG. 6, i.e., (a) thereof, when the current motion direction D1 is a direction towards the center of the motion area Aa, the latent space Sp21, and therefore, the latent area Ap21 become small. Meanwhile, FIG. 6, i.e., (b) thereof, is a planar view of the motion area Aa and a latent area Ap22 when the current motion direction is a motion direction D2 (motion position P22) towards the end portion. As shown in FIG. 6, i.e., (b) thereof, when the current motion direction D2 is a direction towards the end portion of the motion area Aa, the latent space Sp22, and therefore, the latent area Ap22 become larger.

Here, the controller 30 is able to change the latent area Ap based on the current motion direction of the robot 20 in relation to the motion area Aa, during the execution of a predetermined task by the robot 20. As a result of a configuration such as this, the latent area Ap can be appropriately changed based on the current motion direction of the robot 20 in relation to the motion area Aa. Furthermore, the displayed latent area Ap changes in accompaniment with the changes in the current motion direction of the robot 20 during execution of the predetermined task. Therefore, compared to when the latent area Ap is not changed, the attention of a person can be captured.

The latent space Sp of the robot 20 when an abnormality occurs in the robot system 10 changes depending on execution acceleration at which the robot 20 executes a predetermined task. In a manner similar to the above-described execution speed, the execution acceleration is a value that indicates the corresponding percentage of acceleration, with the acceleration at which the robot 20 executes a predetermined task in the shortest amount of time being assigned to 100%. An motion acceleration that is an instantaneous acceleration of the robot 20 also changes based on the execution acceleration. For example, the motion acceleration increases as the execution acceleration increases. Therefore, a setting based on the motion acceleration is also based on the execution acceleration.

For example, in a manner similar to the execution speed in FIG. 3, because the motion speed increases as the execution acceleration increases, the latent space Sp (and therefore, the latent area Ap1) becomes large. In addition, because the motion speed decreases as the execution acceleration decreases, the latent space Sp (and therefore, the latent area Ap2) becomes small. Here, the controller 30 sets the latent area Ap1 when the execution acceleration at which the robot 20 executes a predetermined task is higher than or equal to a predetermined acceleration to be larger than the latent area Ap2 when the execution acceleration is lower than the predetermined acceleration. Specifically, the latent area Ap is set to be larger as the execution acceleration increases. Therefore, the latent area Ap can be appropriately changed based on the execution acceleration of the robot 20.

Figure 7:
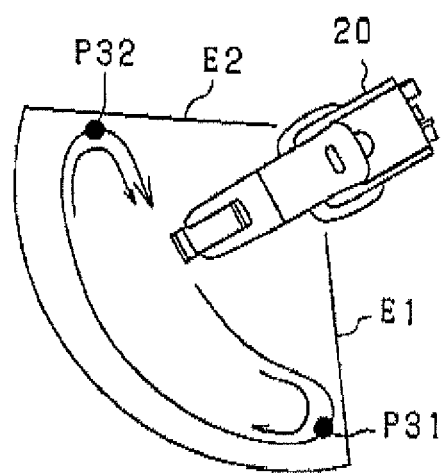
FIG. 7 is a planar view of a mode in which an outer edge of the motion area is set based on an absolute value of motion acceleration.
Figure 8:
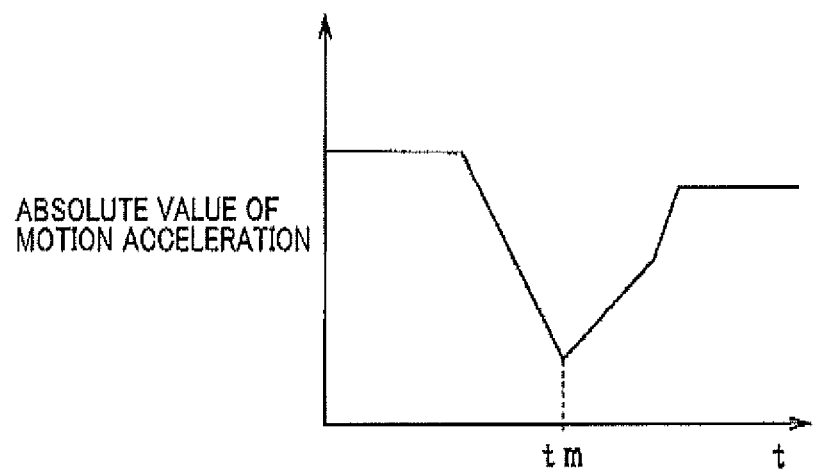
FIG. 8 is a graph of a relationship between time and the absolute value of motion acceleration near a critical motion position.

FIG. 7 is a planar view of a mode in which an outer edge of the motion area Aa is set based on an absolute value of the motion acceleration. As can be seen at motion positions P31 and P32 in FIG. 7, as the motion position of the robot 20 approaches the outer edge of the motion space Sa, the absolute value of motion acceleration, including motion deceleration, decreases so that the motion speed is gradually reduced. The motion positions P31 and P32 are critical motion positions at which the absolute value of motion acceleration becomes a local minimum value. FIG. 8 is a graph of a relationship between time and the absolute value of motion acceleration near the critical motion position P32. As shown in FIG. 8, near the critical motion position P32, the absolute value of motion acceleration decreases, becomes the local minimum value, and subsequently increases again. The motion position at time tm is the critical motion position P32.

Here, the controller 30 calculates the absolute value of motion acceleration for each motion position of the robot 20 for a predetermined task. The controller 30 then sets the outer edge of the motion area Aa based on the critical motion position at which the calculated absolute value of motion acceleration is the local minimum value. Specifically, as shown in FIG. 7, the controller 30 sets an outer edge E1 of the motion area Aa based on the coordinates of the critical motion position P31 and sets an outer edge E2 of the motion area Aa abased on the coordinates of the critical motion position P32. Then, the controller 30 sets the motion area Aa in the shape of a fan that radiates from the robot 20. Therefore, the outer edge of the motion area Aa can be easily and accurately set.

Figure 9:
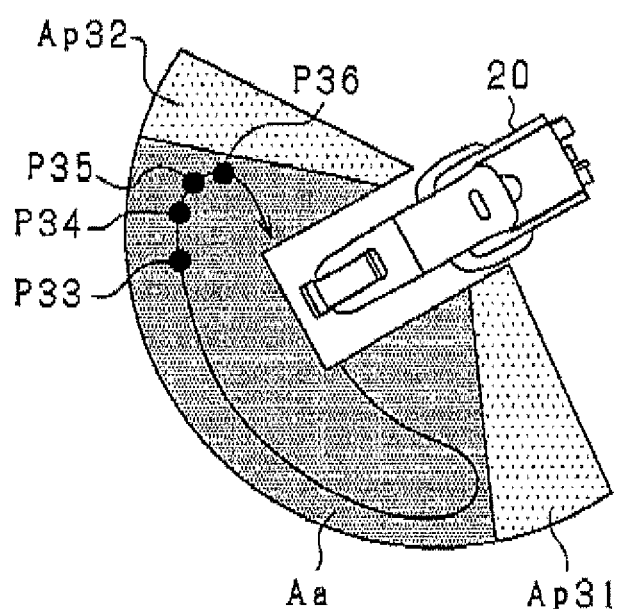
FIG. 9 is a planar view of a mode in which the latent area is set based on the absolute value of motion acceleration.
Figure 10:
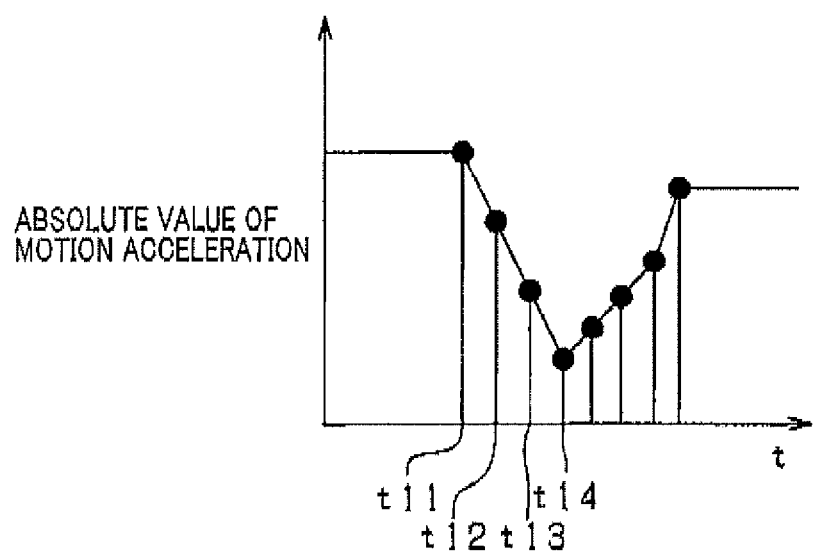
FIG. 10 is a graph of the absolute value of motion acceleration at each motion position near the critical motion position.

The latent space Sp, and therefore, the latent area Ap of the robot 20 when an abnormality occurs in the robot system 10 change depending on the motion speed of the robot 20 near the critical motion position. The motion speed of the robot 20 changes depending on the motion acceleration. Here, as shown in FIG. 9, the controller 30 sets a latent area Ap32 based on the absolute values of motion acceleration at motion positions P33 to P35 that are included in a predetermined area before the critical motion position P36 for a predetermined task. FIG. 10 is a graph of the absolute values of motion acceleration at the motion positions P33 to P35 near the critical motion position P36. The motion positions P33 to P36 respectively correspond to time t11 to t14. Specifically, the latent area Ap is set to be larger as the absolute values of motion acceleration at time t11 to t14 increase. As a result of a configuration such as this, the accuracy of the latent area Ap that is set can be improved while reducing processing load placed on the controller 30.

The latent area Ap may be set based on a combination of the execution speed at which the robot 20 executes a predetermined task, the current motion position of the robot 20 in relation to the motion area Aa during execution of the predetermined task, the current motion direction of the robot 20 in relation to the motion area Aa during execution of the predetermined task, and the execution acceleration at which the robot 20 executes the predetermined task. That is, the latent area Ap may be set based on at least one of the execution speed at which the predetermined task is executed, the current motion position of the robot 20 in relation to the motion area Aa, the current motion direction of the robot 20 in relation to the motion area Aa, and the execution acceleration at which the predetermined task is executed.

The motion area Aa and the latent area Ap may be calculated in advance and stored. The stored motion area Aa and latent area Ap may then be read out before the robot 20 starts a predetermined task.

According to the present first embodiment, the controller 30 irradiates the red light onto the motion area Aa of the robot 20 by the first irradiating unit and irradiates the yellow light onto the latent area Ap of the robot by the second irradiating unit. However, the lights are not limited to red and yellow. Visible light of other colors (that is, wavelengths) may be irradiated onto the motion areas Aa and the latent area Ap. In addition, visible light of the same color (that is, wavelength) may be irradiated onto the motion area Aa and the latent area Ap at differing brightness. In this case as well, a person can differentiate between the motion area Aa and the latent area Ap. Furthermore, visible light of the same color and same brightness may be irradiated onto the motion area Aa and the latent area Ap. In this case as well, a person can visually confirm the motion area Aa and the latent area Ap. Moreover, visible light may be irradiated onto only the motion area Aa. In this case as well, a person can visually confirm the motion area Aa of the robot 20. The person can be prompted to avoid entering the motion area Aa before entering the motion area Aa.

Placement of the irradiating unit 41 is not limited to the setup base 40. The irradiating unit 41 may be provided on a base portion of the robot 20, a ceiling of the plant, or the like. That is, the irradiating unit 41 is merely required to be capable of irradiating visible light onto the motion area Aa and the latent area Ap on the floor 50. In addition, the robot 20 may be directly set on the floor 50.

In cases in which the setup base 40 on which the robot 20 is set has sufficient width and the worker moves on the top surface of the setup base 40, the top surface of the setup base 40 can be considered to be the floor surface on which the visible light is irradiated.

The manner in which the motion area Aa and the latent area Ap are visibly displayed on the floor 50 (that is, the floor surface) is not limited to that in which the visible light is irradiated onto the overall motion area Aa and latent area Ap. For example, visible light may be irradiated onto only the outer edges of the motion area Aa and latent area Ap. In addition, the manner in which the motion area Aa and the latent area Ap are visibly displayed on the floor 50 is not limited to that in which visible light is irradiated onto the motion area Aa and the latent area Ap. The motion area Aa and the latent area Ap can also be displayed with paint or tape.

The robot 20 is not limited to the vertical, articulated-type robot. A horizontal, articulated-type robot or the like can also be used.

(Second Embodiment)

A second embodiment will be described below, with focus on the differences between the second embodiment and the first embodiment. According to the present embodiment, the robot 20 performs a plurality of tasks. Other configurations are similar to those according to the first embodiment. The controller 30 controls the irradiating unit 41 so that visible light is irradiated onto the motion area Aa and the latent area Ap of the task being executed by the robot 20, in a manner similar to that according to the first embodiment.

Figure 11:
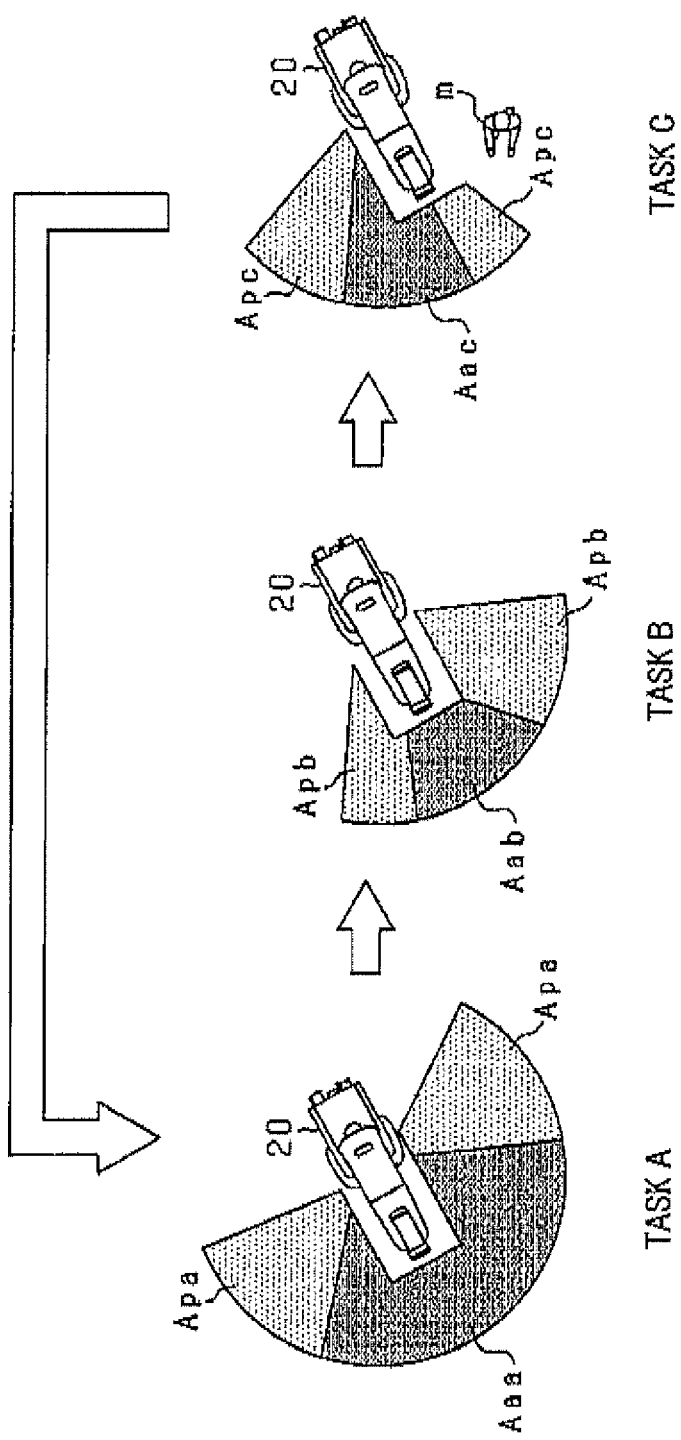
FIG. 11 is a planar view of the motion area and the latent area of the robot for each task.

FIG. 11 is a planar view of an motion area and latent areas of the robot 20 for each task. As shown in FIG. 11, the robot 20 repeatedly performs tasks A to C in this order. The robot 20 may switch to the next task after performing one task for a predetermined amount of time, or may switch to the next task after one task is completed.

Motion areas Aaa to Aac differ from each other. Latent areas Apa to Apc also differ from each other. During task A, the controller 30 irradiates red light onto the motion area Aaa and yellow light onto the latent area Apa. During task B, the controller 30 irradiates red light onto the motion area Aab and yellow light onto the latent area Apb. During task C, the controller 30 irradiates red light onto the motion area Aac and yellow light onto the latent area Apc.

Here, during task C, the position of a worker m is outside of the motion area Aac and the latent area Apc. However, when the robot 20 switches from task C to task A, the position of the worker m is included in the motion area Aaa or the latent area Apa. In this case, unless the worker m moves outside of the motion area Aaa and the latent area Apa before task A is started, the safety of the worker m may be compromised.

Therefore, according to the present embodiment, the controller 30 irradiates, by the second irradiating unit, yellow light onto an area, within a total latent area (Apa+Apb+Apc), that does not include the motion area (such as the motion area Aac) of the task that the robot 20 is currently executing. The total latent area is obtained by adding the latent areas Apa, Apb, and Apc of the tasks.

Figure 12:
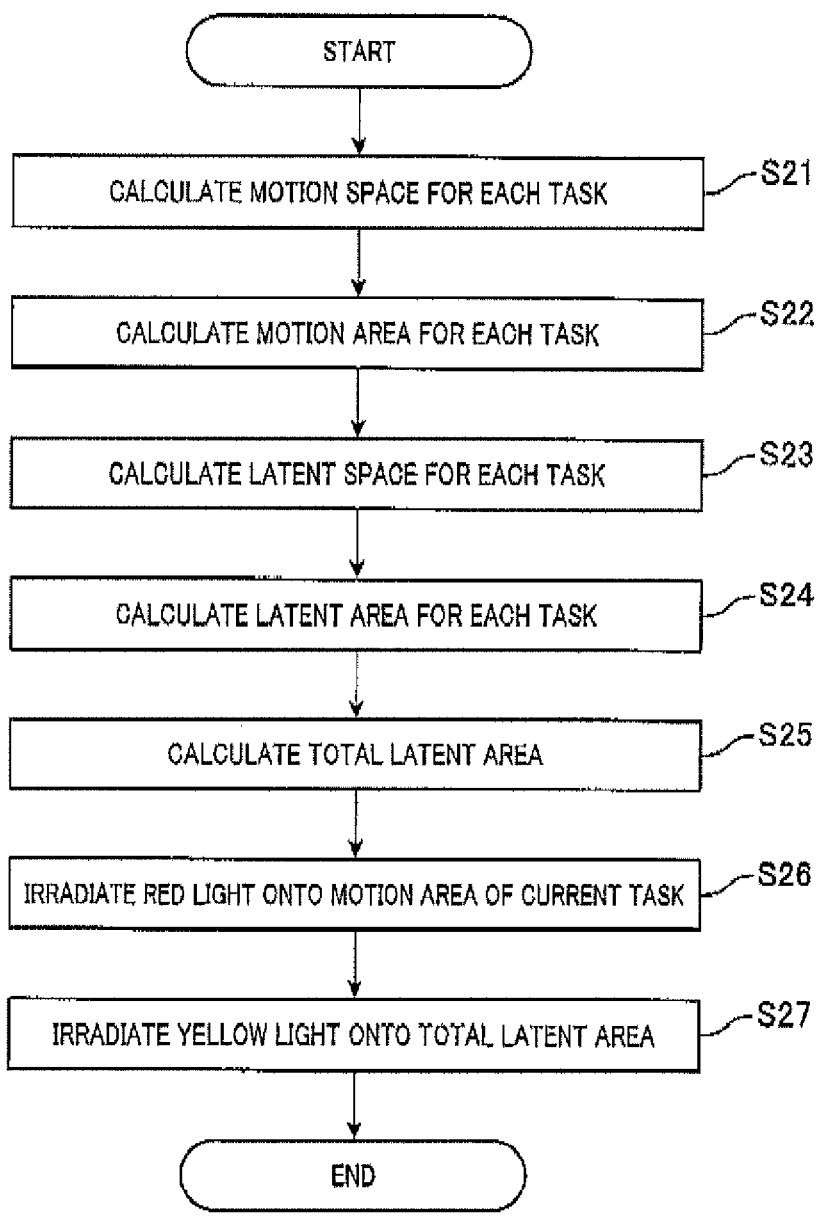
FIG. 12 is a flowchart of the steps in a process in which visible light is irradiated onto the motion area and a total latent area of a current task.

FIG. 12 is a flowchart of the steps in a process for irradiating visible light onto the motion area and the latent area of a current task. This series of processes is performed by the controller 30 before the robot starts the tasks A to C, that is, in a state in which none of the tasks A to C are started.

First, the controller 30 calculates motion spaces Saa to Sac of the robot 20 for the tasks A to C (S21). The method for calculating the motion space Sa of one task is the same as the process at S11 in FIG. 4. The controller 30 calculates the motion areas Aaa to Aac of the robot 20 for the tasks A to C (S22). The method for calculating the motion area Aa of one task is the same as the process at S12 in FIG. 4. The controller 30 calculates latent spaces Spa to Spc of the robot 20 for the tasks A to C (S23). The method for calculating the latent space Sp of one task is the same as the process at S13 in FIG. 4. The controller 30 calculates the latent areas Apa to Apc of the robot 20 for the tasks A to C (S24). The method for calculating the latent area Ap of one task is the same as the process at S14 in FIG. 4.

Next, the controller 30 calculates a total latent area Apt that is the sum of the latent areas Apa, Apb, and Apc of the tasks A to C (S25). Specifically, the controller 30 adds the latent areas Apa, Apb, and Apc, omitting overlaps, and calculates the total latent area Apt. In other words, a smallest area that includes all of the latent areas Apa, Apb, and Apc is calculated as the total latent area Apt.

Next, the controller 30 irradiates red light onto the motion area Aa of the task currently being executed (S26). The method for irradiating the red light onto the motion area Aa is the same as the process at S15 in FIG. 4.

Next, the controller 30 irradiates yellow light onto the total latent area Apt (S27). Specifically, when the yellow light is irradiated onto the total latent area Apt, the yellow light is irradiated by the second irradiating unit onto an area of the total latent area Apt that does not include the motion area Aa of the task currently being executed by the robot 20. Subsequently, the controller 30 ends the series of processes (END). The processes at S26 and S27 are performed each time the robot 20 switches tasks.

Figure 13:
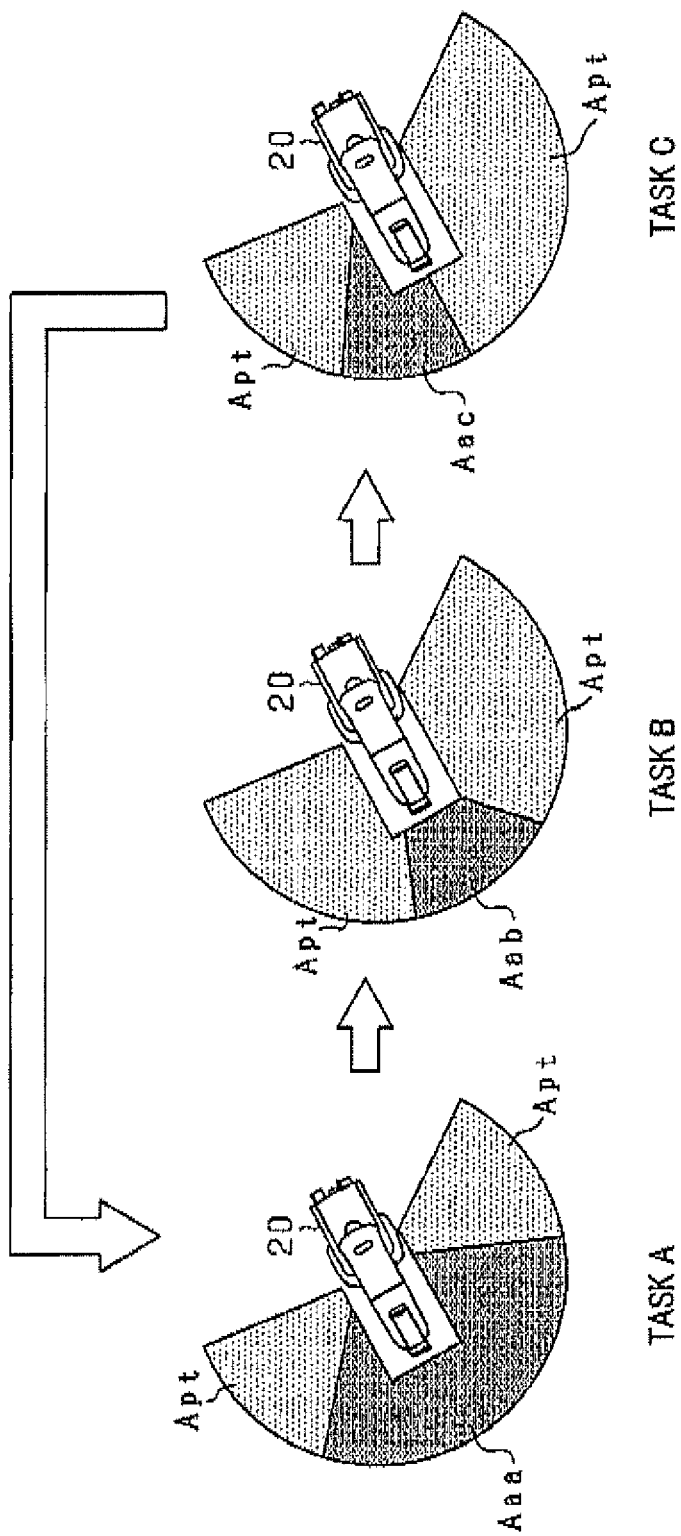
FIG. 13 is a planar view of a mode in which visible light is irradiated onto the motion area and the total latent area for each task.

Then, as shown in FIG. 13, in a state in which the red light is irradiated onto the motion area Aa of the task that is currently being executed and the yellow light is irradiated onto the latent area Apt, the robot 20 performs the tasks A to C.

According to the present embodiment described in detail above, the following advantages are achieved. Only advantages differing from those according to the first embodiment are described herein, Visible light is irradiated onto the motion area Aa of the task currently being executed, among the plurality of tasks A to C executed by the robot 20. Therefore, even when the robot 20 switches tasks, a person can visually confirm the motion area Aa of the task currently being executed. Furthermore, because the irradiated motion area Aa changes, the attention of the person can be captured, compared to when the motion area Aa does not change. In addition, a portion of the body of the person that has entered the motion area Aa is illuminated by the visible light. Therefore, the person can clearly visually confirm entry into the motion area Aa.

Visible light is irradiated onto an area of the total latent area Apt that is not included in the motion area Aa of the task currently being executed by the robot 20. The total latent area Apt is the sum of the latent areas Apa to Apc of the tasks A to C. Therefore, a situation in which a person enters an area to become a latent area Ap when the robot 20 switches tasks can be suppressed in advance. Furthermore, because the proportions of the irradiated total latent area Apt and motion area Aa change, the attention of a person can be captured, compared to when the proportions do not change.

The second embodiment can also be carried out with the following modifications.

As the manner in which the motion areas Aa and the latent areas Ap are visibly displayed during the tasks A to C, the variation examples according to the first embodiment can be applied to an extent that combination is possible.

The total latent area Apt may be an area that is the sum of the latent areas Ap of all tasks executed by the robot 20, or the sum of the latent areas Ap of a part of the tasks including a plurality of tasks. In addition, instead of the configuration in which the yellow light is irradiated onto the total latent area Apt, a configuration in which yellow light is irradiated onto the respective latent areas Apa to Apc of the tasks A to C can also be used.

The controller 30 may control the irradiating unit 41 so that visible light is irradiated onto a total motion area Aat. The total motion area Aat is the sum of the motion areas Aaa to Aac of the tasks A to C. As a result of a configuration such as this, a situation in which a person enters an area to become the motion area Aa when the robot 20 switches tasks can be suppressed in advance.

The total motion area Aat may be an area that is the sum of the motion areas Aa of all tasks executed by the robot 20, or the sum of the motion areas Aa of a part of the tasks including a plurality of tasks.

The controller 30 may irradiate red light onto the total motion area Aat by the first irradiating unit. The total motion area Aat is the sum of the motion areas Aaa to Aac of the tasks A to C. The controller 30 may irradiate, by the second irradiating unit, yellow light onto an area of the total latent area Apt that is not included in the total motion area Aat. The total latent area Apt is the sum of the latent areas Apa to Apc of the tasks A to C. As a result of a configuration such as this, a person can differentiate between and visually confirm the total motion area Aat and the total latent area Apt of the robot 20.

(Third Embodiment)

Figure 14:
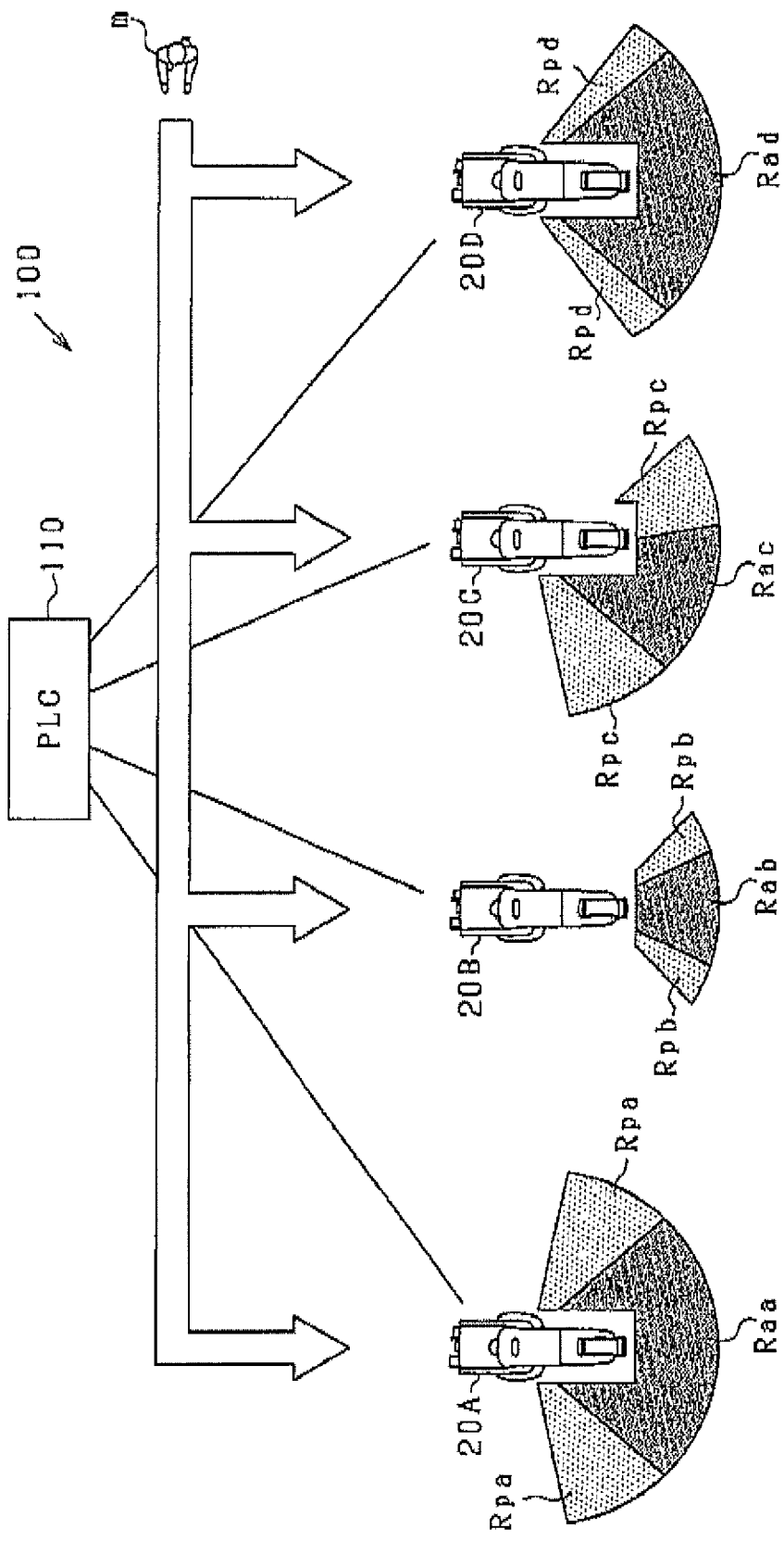
FIG. 14 is a planar view of an overview of a robot system having a plurality of robots.

A third embodiment will be described below, with focus on the differences between the third embodiment and the first embodiment. According to the present embodiment, as shown in FIG. 14, a robot system 100 includes a plurality of robots 20A to 20D and a programmable logic controller (PLC) 110. The robots 20A to 20D are set on the floor 50 so as to be adjacent to each other. The PLC 110 includes a CPU, a ROM, a RAM, and the like. The PLC 110 is a high-order controller that controls the respective controllers 30 of the robots 20A to 20CD. Other configurations are similar to those according to the first embodiment.

The robots 20A to 20D each have a configuration similar to that of the robot 20 according to the first embodiment. Each of the robots 20A to 20D is controlled by a controller 30 (not shown). The robots 20A to 20D each perform a predetermined task. The respective controllers 30 of the robots 20A to 20D radiate red light onto the respective motion area and yellow light onto the respective latent area in a manner similar to that according to the first embodiment. A worker m works near each robot 20A to 20D. The worker m can visually confirm motion areas Raa to Rad and latent areas Rpa to Rpd.

Each of the robots 20A to 20D includes an auxiliary irradiating unit, in addition to the irradiating unit 41 that is a main irradiating unit. The auxiliary irradiating unit irradiates visible light differing from the visible light irradiated by the irradiating unit 41. Specifically, the main irradiating unit includes a first irradiating unit that irradiates red light and a second irradiating unit that irradiates yellow light. The auxiliary irradiating unit irradiates green light. The auxiliary irradiating unit has a configuration similar to those of the first irradiating unit and the second irradiating unit. Specifically, the auxiliary irradiating unit is provided with a plurality of green LEDs.

Of the robots that are set so as to be adjacent to each other, one robot is considered a first robot and the other a second robot. In this case, the main irradiating unit of the first robot is a first irradiating unit. The main irradiating unit of the second robot is a second irradiating unit. In addition, the auxiliary irradiating unit of the first robot is a first auxiliary irradiating unit. The auxiliary irradiating unit of the second robot is a second auxiliary irradiating unit. Furthermore, the motion area of the first robot is a first motion area. The motion area of the second robot is a second motion area. The forcible stopping unit of the first robot is a first forcible stopping unit. The forcible stopping unit of the second robot is a second forcible stopping unit. The latent area of the first robot is a first latent area. The latent area of the second robot is a second latent area.

Here, the second latent area may be larger than an area obtained by the first latent area being added to the first motion area. For example, in FIG. 14, when the worker m is present near the robot 20B, the latent area Rpa of the robot 20A (second robot) is larger than the area obtained by the latent area Rpb being added to the motion area Rab of the robot 20B (first robot). In this case, when the worker m approaches the robot 20A under an assumption that the latent area Rpa and the latent area Rpb are about the same size, the worker m may enter the latent area Rpa.

Here, according to the present embodiment, a predicted area is set based on an area that is the area of the second latent area and the second motion area outside of the first motion area and the first latent area, when the second latent area and the second motion area are overlapped with the first motion area and the first latent area based on aligned reference positions. The PLC 110 then makes the auxiliary irradiating unit irradiate green light onto the predicted area, with the controller 30.

Figure 15:
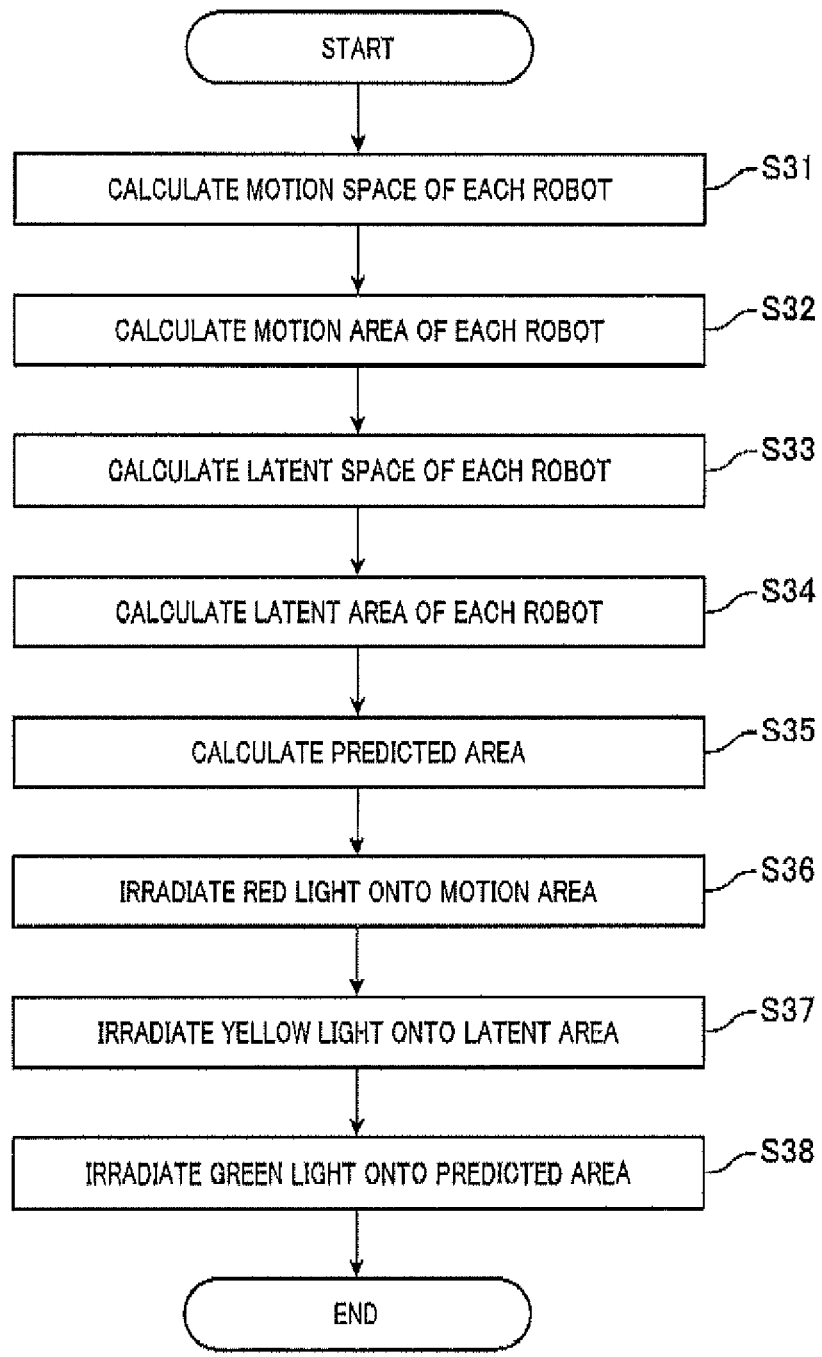
FIG. 15 is a flowchart of the steps in a process in which visible light is irradiated onto the motion area, the latent area, and a predicted area.

FIG. 15 is a flowchart of the steps in a process in which visible light is irradiated onto the motion area, the latent area, and the predicted area. This series of processes is performed by the PLC 110 and the controllers 30, in cooperation with each other, before the robots 20A to 20D start the predetermined tasks, that is, in a state in which none of the robots 20A to 20D have started a task.

First, the PLC 110 and the controller 30 calculate, in cooperation with each other, the motion spaces for the predetermined tasks of the robots 20A to 20D (S31). The method for calculating the motion space of a task by one robot is the same as the process at S11 in FIG. 4. The PLC 110 and the controller 30 calculate the motion areas Raa to Rad for the predetermined tasks of the robots 20A to 20D (S32). The method for calculating the motion area of a task by one robot is the same as the process at S12 in FIG. 4. The PLC 110 and the controller 30 calculate the latent spaces for the predetermined tasks of the robots 20A to 20D (S33). The method for calculating the latent space of a task by one robot is the same as the process at S13 in FIG. 4. The PLC 110 and the controller 30 calculate the latent areas Rpa to Rpd for the predetermined tasks of the robots 20A to 20D (S34). The method for calculating the latent area of a task by one robot is the same as the process at S14 in FIG. 4.

Next, the PLC 110 calculates a predicted area Rf based on the area of the second latent area and the second motion area outside of the first motion area and the first latent area when the second latent area and the second motion area are overlapped with the first motion area and the first latent area based on aligned reference positions (S35). Specifically, the PLC 110 calculates a predetermined proportion of an area obtained by an area that is the sum of the first motion area and the first latent area being subtracted from an area that is the sum of the second latent area and the second motion area, with a reference position (such as reference coordinates) being aligned between the robots. When the second robot is present on both sides of the first robot, the second latent areas and the second motion areas of the second robots on both sides are considered.

Next, the PLC 110 irradiates the red light onto the motion areas Raa to Rad of the robots 20A to 20D (S36). The method for irradiating the red light onto the motion area is the same as the process at S15 in FIG. 4.

Next, the PLC 110 irradiates the yellow light onto the latent areas Rpa to Rpd of the robots 20A to 20D (S37). The method for irradiating the yellow light onto the latent area is the same as the process at S16 in FIG. 4.

Then, the PLC 110 irradiates the green light onto the predicted area Rf by the auxiliary irradiating unit (S38). Subsequently, the PLC 110 ends the series of processes (END). The processes at S35 and S38 are performed each time the robot that is the first robot is switched as a result of movement of the worker m.

Figure 16:
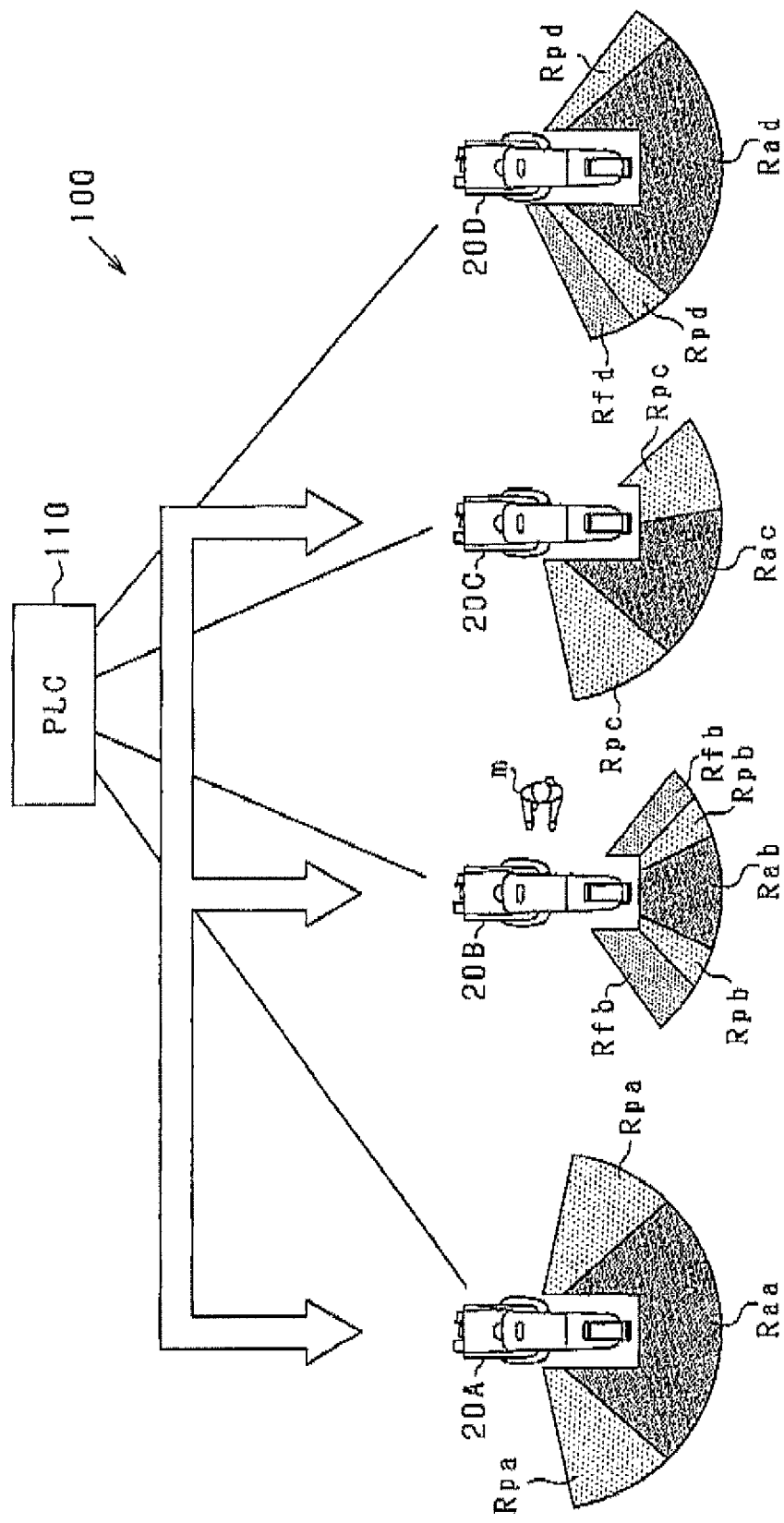
FIG. 16 is a planar view of a mode in which visible light is irradiated onto the motion area, the latent area, and the predicted area.

As shown in FIG. 16, for example, when the worker m is present near the robot 20B, the robots 20A to 20D execute the predetermined tasks in a state in which the green light is irradiated onto a predicted area Rfb in correspondence with the robot 20B. For example, when the worker m is present near the robot 20D, the robots 20A to 20D execute the predetermined tasks in a state in which the green light is irradiated onto a predicted area Rfd in correspondence with the robot 20D.

According to the present embodiment described in detail above, the following advantages are achieved. Only advantages differing from those according to the first embodiment and the second embodiment are described herein.

The predicted area Rf is set based on the area of the second latent area and the second motion area outside of the first motion area and the first latent area, when the second latent area and the second motion area are overlapped with the first motion area and the first latent area based on aligned reference positions. The green light is irradiated onto the predicted area Rf by the auxiliary irradiating unit. Therefore, a person present near the first robot can become aware that the second latent area is larger than the first latent area in advance. Consequently, when the worker m who is present near the first robot approaches the second robot, a situation in which the person enters the second latent area can be suppressed.

The third embodiment can also be carried out with the following modifications.

The auxiliary irradiating unit may irradiate yellow light or red light. That is, the auxiliary irradiating unit may irradiate visible light that is the same as that of the main auxiliary irradiating unit. In this case as well, a person present near the first robot can be warned that the second latent area is larger than the first latent area, in advance.

The latent space (second latent space) of the second robot when an abnormality occurs in the robot system 100 becomes larger as the execution speed at which the second robot executes a predetermined task increases. Here, the PLC 100 and the controller 30 may set the second latent area when the execution speed at which the second robot executes the predetermined task is higher than or equal to a predetermined speed to be larger than the second latent area when the execution speed is lower than the predetermined speed. As a result of a configuration such as this, the size of the second latent area can be appropriately set based on the execution speed of the second robot. In addition, the predicted area that is set based on the area of the second motion area and the second latent area outside of the first motion area and the first latent area when the second motion area and the second latent area are overlapped with the first motion area and the first latent area based on aligned reference positions can be appropriately set.

Because the motion speed increases as the execution acceleration at which the second robot executes a predetermined task increases, the second latent space Sp when an abnormality occurs in the robot system 100 becomes large. Here, the PLC 100 and the controller 30 may set the second latent area when the execution acceleration at which the second robot executes the predetermined task is higher than or equal to a predetermined acceleration to be larger than the second latent area when the execution acceleration is lower than the predetermined acceleration. As a result of a configuration such as this, the size of the second latent area can be appropriately set based on the execution acceleration of the second robot. In addition, the predicted area that is set based on the area of the second motion area and the second latent area outside of the first motion area and the first latent area when the second motion area and the second latent area are overlapped with the first motion area and the first latent area based on aligned reference positions can be appropriately set.

The second latent space when an abnormality occurs in the robot system 100 changes depending on the current motion position of the second robot in relation to the second motion area during execution of a predetermined task by the second robot. For example, the second latent space becomes small when the current motion position is near the center of the second motion area. The second latent space becomes large when the current motion position is near an end portion of the second motion area. Here, the PLC 100 and the controller 30 may change the second latent area based on the current motion position of the second robot in relation to the second motion area during execution of the predetermined task by the second robot. As a result of a configuration such as this, the second latent area, and therefore, the predicted area can be appropriately changed based on the current motion position of the second robot in relation to the second motion area. Furthermore, because the displayed predicted area changes in accompaniment with the changes in the current motion position of the second robot, the attention of a person can be captured, compared to when the predicted area does not change.

The second latent space when an abnormality occurs in the robot system 100 changes depending on the current motion direction of the second robot in relation to the second motion area during execution of a predetermined task by the second robot. For example, the second latent space becomes small when the current motion direction is towards the center of the second motion area. The second latent space becomes large when the current motion direction is towards an end portion of the second motion area. Here, the PLC 100 and the controller 30 may change the second latent area based on the current motion direction of the second robot in relation to the second motion area during execution of the predetermined task by the second robot. As a result of a configuration such as this, the second latent area, and therefore, the predicted area can be appropriately changed based on the current motion direction of the second robot in relation to the second motion area. Furthermore, because the displayed predicted area changes in accompaniment with the changes in the current motion direction of the second robot, the attention of a person can be captured, compared to when the predicted area does not change.

The second latent space when an abnormality occurs in the robot system 100 changes depending on the deceleration characteristics of the second robot. For example, the second latent space becomes small when the deceleration characteristics of the second robot indicate ease in deceleration. The second latent space becomes large when the deceleration characteristics of the second robot indicate difficulty in deceleration. Here, the PLC 100 and the controller 30 may set the second latent area based on the deceleration characteristics of the second robot. As a result of a configuration such as this, because the second latent area, and therefore, the predicted area are appropriately set based on the deceleration characteristics of the second robot, the accuracy of the predicted area that is set can be improved.

As the manner in which the motion areas and the latent areas are visibly displayed during the predetermined tasks by the robots 20A to 20D, the other variation examples according to the first embodiment can also be applied to an extent that combination is possible.

The robots 20A to 20D may each perform a plurality of tasks. In this case, as the manner in which the motion area and the latent area are visibly displayed during each task, the second embodiment and the variation examples according to the second embodiment can be applied to an extent that combination is possible.

The second motion area may be larger than the first motion area. In this case, when the worker m approaches the second robot under the assumption that the second motion area and the first motion area are about the same size, the worker m may enter the second motion area. Here, the PLC 110 and the controller 30 irradiates the red light onto the first motion area by the first irradiating unit, and sets the predicted area Rf based on an area of the second motion area outside of the first motion area when the second motion area is overlapped with the first motion area based on aligned reference positions. Then, the green light can be irradiated onto the predicted area Rf by the auxiliary irradiating unit. As a result of a configuration such as this, the worker M who is present near the first robot can be made aware that the second motion area is larger than the first motion area, in advance. Consequently, when the worker m who is present near the first robot approaches the second robot, a situation in which the worker m enters the second motion area can be suppressed.

The second motion area may be larger than an area obtained by the first latent area being added to the first motion area. In this case, when the worker m approaches the second robot under the assumption that the second motion area and the area obtained by the first latent area being added to the first motion area are about the same size, the worker m may enter the second motion area. Here, the PLC 110 and the controller 30 can also set a predicted area based on an area of the second motion area outside of the first motion area and the first latent area, when the second motion area is overlapped with the first motion area and the first latent area based on aligned reference positions. As a result of a configuration such as this, when the worker m who is present near the first robot approaches the second robot, a situation in which the worker m enters the second motion area can be suppressed.

The robots 20A to 20D are not limited to the same type of robot and may include differing types of robots.

The robots 20A to 20D are not limited to a configuration in which the robots 20A to 20D are set facing the same direction. A configuration is also possible in which the robots 20A to 20D are facing differing directions. In this case as well, the predicted area may be set based on the area of the second motion area and the second latent area outside of the first motion area and the first latent area, when the second motion area and the second latent area are overlapped with the first motion area and the first latent area based on aligned reference positions. In addition, the predicted area may be set based on the area of the second motion area outside of the first motion area when the second motion area is overlapped with the first motion area based on aligned reference positions.

EXPLANATION OF REFERENCE NUMBERS

10: robot system
20: robot
20A: robot
20B: robot
20C: robot
20D: robot
30: controller (control unit, forcible stopping unit)
41: irradiating unit (first irradiating unit, second irradiating unit, main irradiating unit)
50: floor (floor surface)
100: robot system
110: PLC (control unit)

What is claimed is:

1. A robot system comprising:
a robot installed on a surface of a floor, the robot executing a plurality of tasks;
an irradiating unit irradiating visible light onto the surface of the floor, the irradiating unit including:
   a first irradiating unit that irradiates a first visible light onto the surface of the floor in a designated color; and
   a second irradiating unit that irradiates a second visible light onto the surface of the floor in a further designated color which is different from the designated color of the first visible light;
a forcible stopping unit forcibly stopping the robot from moving when an abnormality occurs in the robot system; and
a control unit controlling the irradiating unit to i) irradiate the first visible light onto a motion area on the surface of the floor, the motion area being an area occupied on the surface of the floor by a space within which the robot is allowed to move during execution of each of the tasks, the motion area being changeable for each of the tasks, and to ii) irradiate the second visible light onto a latent area onto the surface of the floor, the latent area being an area occupied on the surface of the floor by a space within which the robot is likely to move until the robot is forcibly stopped by the forcible stopping unit during execution of the tasks, the latent area being changeable for each of the tasks,
wherein the latent area is composed of a total latent area obtained by totaling a plurality of latent areas corresponding respectively to the plurality of tasks, the total latent area including an area excluded from the motion area required for each of the tasks, and
the control unit is configured to control, for each of the tasks, the irradiating unit to irradiate the second light onto the area excluded from the motion area.

2. The robot system according to claim 1, wherein
the robot is an industrial robot having an arm movable to occupy the motion area,
the motion area is composed of a total motion area obtained by totaling a plurality of the motion areas corresponding respectively to the plurality of the tasks, and
the control unit is configured to control the first irradiating unit to irradiate the first light onto the total motion area.

3. The robot system according to claim 1, wherein the robot consists of a plurality of industrial robots executing the plurality of tasks.

4. The robot system according to claim 3, wherein the plurality of industrial robots correspond one by one to the plurality of tasks.

5. The robot system according to claim 2, wherein the robot consists of a plurality of industrial robots executing the plurality of tasks.

6. The robot system according to claim 5, wherein the plurality of industrial robots correspond one by one to the plurality of tasks.

7. The robot system according to claim 1, wherein
the robot is an industrial robot,
the motion area is composed of first and second motion areas,
the latent area is composed of first and second latent areas,
the irradiating unit includes a further irradiating unit that irradiates a third visible light differing in color from the first and second light of the visible light, and
the control unit is configured to irradiate the third light onto a predicted area on the surface of the floor, the predicted area being set based on an area located outside the first motion and latent areas when the second motion and latent areas are overlapped with the first motion and latent areas based on an aligned reference position.

8. The robot system according to claim 1, wherein
the robot is an industrial robot, and
the control unit is configured to dynamically, task by task, calculate a size and a location of the latent area depending on both an execution speed and deceleration characteristics of the robot.

9. The robot system according to claim 2, wherein
the control unit is configured to dynamically calculate a size and a location of the latent area depending on both an execution speed and deceleration characteristics of the robot.

10. The robot system according to claim 2, wherein the latent area is set outside the motion area on the floor.

* * * * *